(12) United States Patent
Fong et al.

(10) Patent No.: US 6,904,593 B1
(45) Date of Patent: Jun. 7, 2005

(54) METHOD OF ADMINISTERING SOFTWARE COMPONENTS USING ASYNCHRONOUS MESSAGING IN A MULTI-PLATFORM, MULTI-PROGRAMMING LANGUAGE ENVIRONMENT

(75) Inventors: Kester Lijen Fong, Los Altos, CA (US); Sreerupa Sen, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/534,703

(22) Filed: Mar. 24, 2000

(51) Int. Cl.[7] .................................................. G06F 9/45
(52) U.S. Cl. ...................................................... 717/171
(58) Field of Search ........................ 717/171, 120–123, 717/101–103; 709/223

(56) References Cited

U.S. PATENT DOCUMENTS

| | | | |
|---|---|---|---|
| 5,581,764 A | 12/1996 | Fitzgerald et al. | 709/223 |
| 5,634,011 A | 5/1997 | Auerbach et al. | 709/242 |
| 5,732,263 A * | 3/1998 | Havens et al. | 707/103 R |
| 5,919,247 A | 7/1999 | Van Hoff et al. | 709/217 |
| 6,067,545 A | 5/2000 | Wolff | 707/10 |
| 6,122,664 A | 9/2000 | Boukobza et al. | 709/224 |
| 6,321,258 B1 | 11/2001 | Stollfus et al. | 709/220 |
| 6,324,619 B1 * | 11/2001 | Raverdy et al. | 717/120 |
| 6,393,605 B1 * | 5/2002 | Loomans | 717/121 |
| 6,405,364 B1 * | 6/2002 | Bowman-Amuah | 717/101 |
| 6,434,739 B1 * | 8/2002 | Branson et al. | 717/108 |
| 6,460,070 B1 | 10/2002 | Turek et al. | 709/202 |
| 6,496,871 B1 | 12/2002 | Jagannathan et al. | 719/317 |
| 6,553,403 B1 | 4/2003 | Jarriel et al. | 709/202 |
| 6,581,104 B1 | 6/2003 | Bereiter | 709/232 |
| 6,691,165 B1 | 2/2004 | Bruck et al. | 709/227 |

OTHER PUBLICATIONS

"Microsoft Computer Dictionary, 4th Edition" Microsoft Press, 1999, pp. 114, 147.*
Bjornerstedt et al., Advance: An Object Management System, 1988, ACM, p. 206–221.*
Lewandowski, Frameworks for Component–Based Client/Server Computing, 1998, ACM, p. 3–27.*

\* cited by examiner

*Primary Examiner*—John Chavis

(57) ABSTRACT

A method for performing life cycle management of business software applications and their components across a multiple-platform, multiple-language network. The method takes advantage of the inheritance properties of object-oriented programming (OOP) by developing all components of a business application from a set of base classes, thus deploying a common set of methods across all application components. The Central Administrator then determines when a need to reconfigure one or more components of the business application has arisen. The Central Administrator then modifies or replaces existing components of the business application or installs entirely new components over the network without end user interaction. In one embodiment of the present invention, the Central Administrator is aided by a set of Distributed Administrators located on each virtual node server/host computer of a business application operating over a network.

34 Claims, 8 Drawing Sheets

METHOD OF ADMINISTERING SOFTWARE COMPONENTS USING ASYNCHRONOUS MESSAGING IN A MULTI-PLATFORM, MULTI-PROGRAMMING LANGUAGE ENVIRONMENT

BACKGROUND OF THE INVENTION

1. Field of the Invention

The present invention relates to the distribution of software over a network, specifically management of installed software components.

2. Description of the Related Art

In large scale networks such as the Internet, or intranets within businesses, the distribution or life cycle management (LCM) of business software applications is often a manual and laborious process which requires the correct use of such program tools as FTP, TAR, COMPRESS, UUDECODE, and ZIP. The variety of platforms and tools and the complexity of the installation procedures make this manner of distribution a complex and costly operation. Software installation is therefore frequently performed by specially trained personnel rather than end-users of the software.

Business software often consist of multiple sets of computer instructions known in the art as "components" in various forms (e.g., firmware, microcode, object code, binaries). Modem, complex software systems may also employ code modules or components written in a number of computer programming languages, such as the well-known C++ or Java languages. Components of these applications may also run on multiple computers ("nodes" or "platforms") simultaneously. Such applications are commonly said to operate in a "multi-platform" and/or "multi-threaded" environment. All of these factors increase the difficulty and expense of installing, updating, repairing, and generally maintaining the software components comprising the business application.

The Internet has significantly accelerated the release schedule of applications as well. Software is released (i.e., distributed to the user community) more frequently and in smaller increments; as a result, many more software upgrade and/or installations have to be performed, resulting in more work for the system software maintenance personnel. This multitude of releases can cause version control (also known as "versioning") problems when a new piece of installed software becomes incompatible with some previously installed software. It is thus desirable to automate this update process.

Prior art systems, such as the one disclosed in U.S. Pat. No. 5,919,247, METHOD FOR THE DISTRIBUTION OF CODE AND UPDATES, to van Hoff, et al. and incorporated herein by reference in its entirety, attempt to address the problems described above using a technique known in the art as "data push." Data push operates by sending updates and information automatically after receipt of an initiating request from the user. Such systems, however, require that the user (or the application to be maintained) recognize that maintenance is needed and request service from a Central Administrator function before maintenance is performed by the automated Administration function.

Another approach known in the art is the use of the Common Object Request Broker Architecture (CORBA). CORBA is described in detail in Robert Orfali's and Dan Harkey's *Client/Server Projramming with JAVA™ and CORBA* (John Wiley & Sons, 1997), incorporated herein by reference in its entirety. In a CORBA-based system, extensive adaptations are required in the business application (i.e., that part of the code that performs the functions required by the users, as opposed to the part that merely interfaces to a network or life cycle management system) to adapt it for LCM monitoring and maintenance. These modifications increase the cost and complexity of the business application itself.

Furthermore, prior art CORBA-based LCM schemes are tightly coupled to the Administrator module within the CORBA architecture, known as the Object Request Broker (ORB). In a CORBA system, if the ORB crashes or is otherwise unavailable, the entire business application, including the LCM functions, halts. All of the application components, whether purely business- or LCM-related (or even hybrid components), rely on the common ORB.

What is needed is a method of distributing and updating the components of business application software in an automated, scaleable, user-transparent way that enables monitoring and maintenance across multiple network nodes independent of component language. The desired method would not impact the business application itself or increase development costs or complexity. Furthermore, such a system must be robust enough so that the business application can operate "non-stop" even if the Administrator function is crashed or otherwise unable or unavailable to monitor and maintain the components.

JAVA is a trademark of Sun Microsystems, Inc. of Menlo Park, Calif.

SUMMARY

A method for performing life cycle management of business software applications and their components across a multiple-platform, multiple-language network is provided. The method takes advantage of the inheritance properties of object-oriented programming (OOP) by developing all components of a business application from a set of base classes, thus deploying a common set of methods across all application components. These methods enable monitoring of all components by a Central Administrator element without any interdependence between the business application components and the Central Administrator. The independent nature of the Central Administrator element of the present invention avoids the known shortcoming of the CORBA prior art: the present invention will not fail or halt even if the Central Administrator element is unavailable. (In a CORBA implementation, if the broker is unavailable, none of the CORBA components can be reached. Similarly, in EJB if the app server goes down, all components go down as well.)

The Central Administrator determines, with human supervisory input or by its own automatic means, such as sensing the passage of a pre-defined period of time, when a need to reconfigure one or more components of the business application has arisen.

The Central Administrator modifies or replaces existing components of the business application or installs entirely new components over the network without the need for end user interaction. In one embodiment of the present invention, the Central Administrator is aided by a set of Distributed Administrators located on each virtual node of a business application operating on multiple host computers in a network.

Using the system and method of the present invention, the business application can be reconfigured without terminating the application's business function, although a short pause in operations may be required.

The present invention is fully scaleable to multiple computer and operating system platforms as well as to multiple programming languages. Scaleability is accomplished by careful separation of central and distributed administration functions and the minimization of message traffic between them. Furthermore, simple state synchronization techniques further aid scaleability and user/business application transparency.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Introduction

The present invention provides those responsible for managing the configuration of business application software the ability to maintain and upgrade, on a component-by-component basis, entire applications without disruption in end user service. Furthermore, the entire life cycle management (LCM) function (generally referred to as "LCM Services") is integrated into the software application itself in a scaleable, robust, and user-transparent fashion. No adaptation of the application's business functions is required: business applications are built from standard software objects and components well-known in the art. The application build proceeds from a particular set of base classes and within a defined object framework that has no effect on the business function but enables complete LCM functionality.

Architecture

Life cycle management comprises provision of the following functionality in conjunction with the application's "business" function(s):

Component deployment

Component startup

Component shutdown

Dynamic component configuration

Load balancing (by adding or deleting component instances)

Component upgrade (new version deployment)

Failure recovery

Component naming

This LCM function set defines the essential requirements for the LCM Services module of the larger, "integrated" application (i.e., the software product containing all of the business functional components plus the components required to implement the LCM functions).

The present invention provides the above LCM functionality by integrating a set of services with the business functions using well-known object-oriented programming (OOP) classes, methods, and structures. In particular, the present invention implements an object Administration framework and a set of base classes that allow both LCM and business application component modularity to be preserved independently of the operating node (in a distributed application) and the source language of the code of each and every component.

Figure 1:
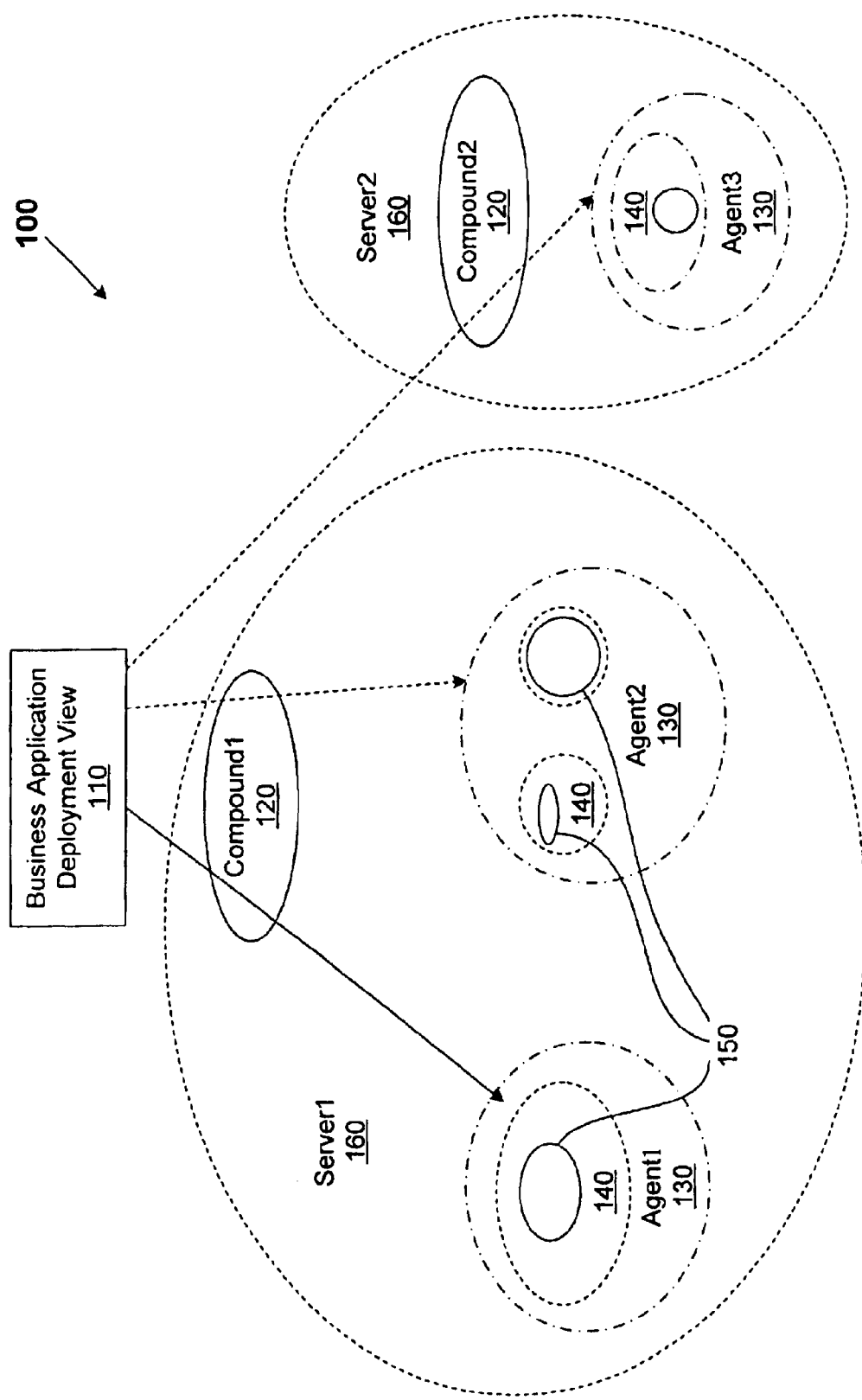
FIG. 1 is a high-level representation of a business application deployment view, according to one embodiment of the present invention.

FIG. 1 illustrates the relationship of the above objects from the perspective of a deployed application according to one embodiment of the present invention. With respect to life-cycle management, a business application ("product") 100 is treated as a collection of compliant components 150. Components 150 are managed by containers 140, run in the context of agents 130 and may be grouped logically into compounds 120. A product (the "application") 100 is a collection of one or more compounds 120 deployed on one or more servers 160. A deployment view 10 is a deployed instance of a product.

Central Administrator

Figure 2:
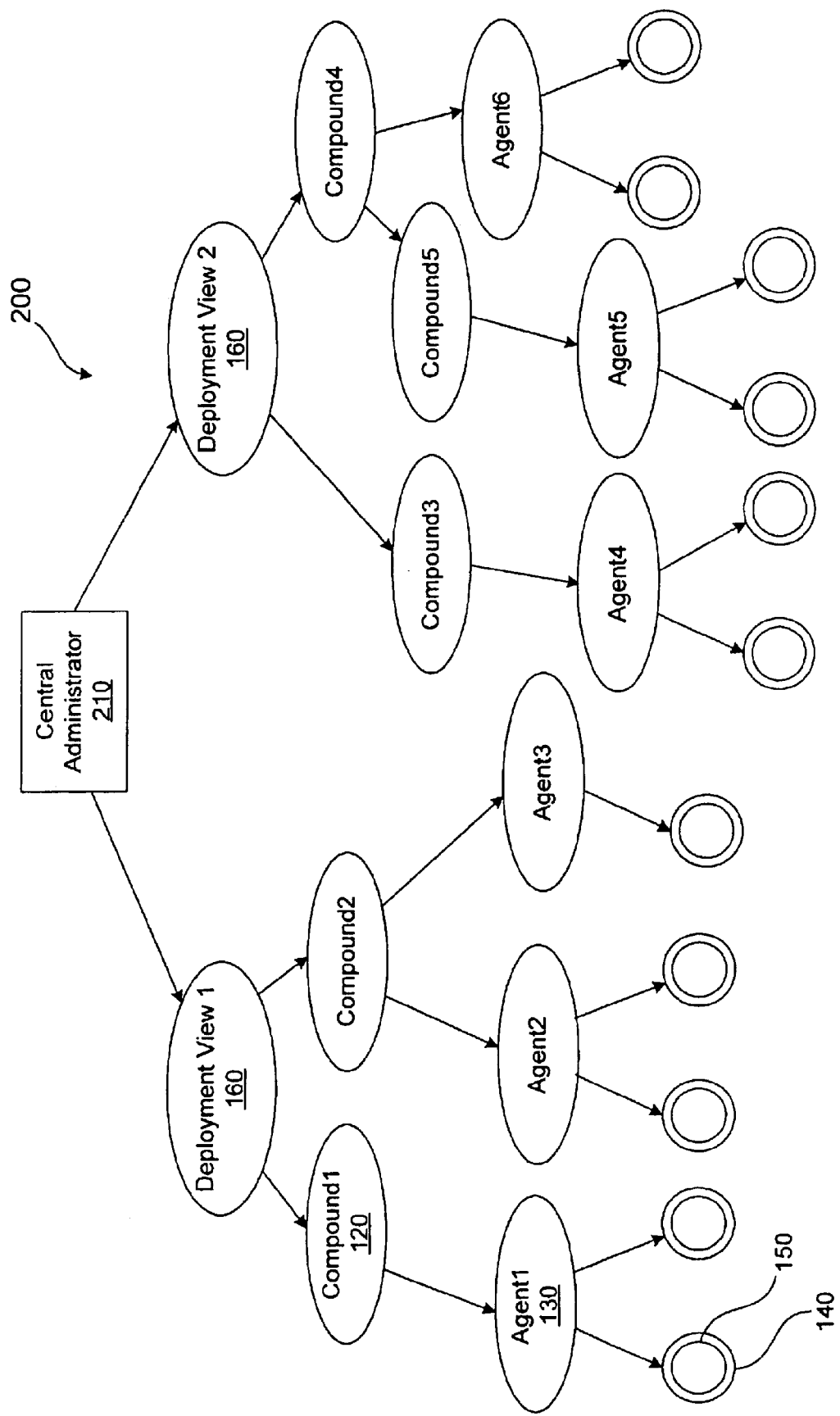
FIG. 2 is a high-level hierarchy of a product deployment view with a Central Administrator according to one embodiment of the present invention.

A Central Administrator (CA) 210 (FIG. 2) manages the life-cycle of the entire product. CA 210 sits at the root of the deployment tree for the product, as shown in FIG. 2. CA 210 controls the deployment, initialization, startup, configuration, shutdown, removal and version upgrades of all the components in the deployment view.

Figure 3:
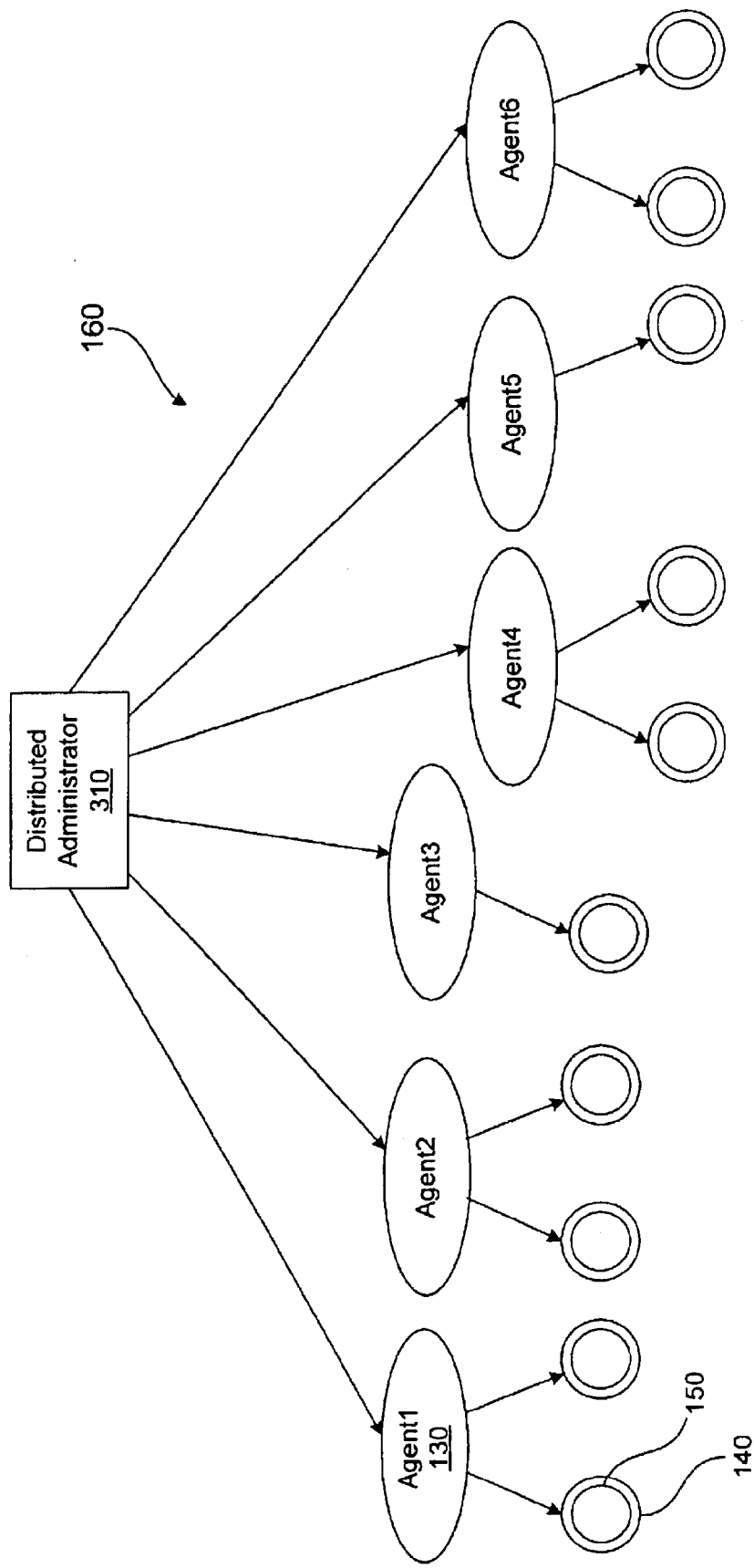
FIG. 3 is a high-level hierarchy of a product deployment process/thread view in a distributed node, according to an alternate embodiment of the present invention.

The product (application) 200 may run on one of or across several processing nodes or hosts, spanning multiple servers 160. (The set of nodes may also include virtual nodes defined by an administration or message transport system architecture, discussed in greater detail below.) In the multi-node or distributed processing embodiment, shown in FIG. 3, the nodes are connected by any one of the many network topologies known in the art. Every node therein has a Distributed Administrator (DA) 310, which is a process manager for the agents 130 running on each node. DA 310 is totally unaware of the application hierarchy structure: it only has knowledge of the agents it manages on its node.

CA 210, agents 130, and DA 310 are independent processes. Agent instances of the same type are managed by an agent manager in conjunction with CA 210. The agent manager and compounds 120 (discussed further below) are entities within the process space of CA 210. Containers 140 and components 150 are entities within the agent process space.

Central Administrator 210, Distributed Administrator 310 (where used), agents 130 and containers 140 are all clients for a separate Transport Services entity. Each has service queues associated with them, through which they communicate with each other. Communication is message-oriented. CA 210, DA 310, containers 140, and agents 130 all act both as Java Message Service (JMS) clients and JMS servers.

Java Message Service (JMS) is one form of a transport service, which is simply a conventional way for one component to communicate with another via messaging. Accordingly, while the Java Message Service (JMS) is described as one species of a conventional transport service, the present invention is not limited to JMS alone.

Component

A component 150 (as far as applications are concerned) is the business logic implementation, the basic building block of the system product, and it cannot be sub-componentized. An instance of a component runs as a thread or as multiple threads (depending on whether the component is single-threaded or multi-threaded) within an agent 130, managed by a container 140. Collections of components are called compounds 120 and are further discussed below.

A component is the simplest addressable logical element within a product. A component is addressable only within the context of a compound, since a component may logically be part of more than one compound. The deployment information for a component within the context of a compound is a part of the component's deployment information. It is the responsibility of LCM Services to translate logical names like Compound1\Comp11 to the correct server, process, and instance of Comp11, where Compound1 and Comp11 are compound and component types, respectively.

Components shared by different compounds have the same code base. This is singularly important, as it means that version upgrading a compound can have far-reaching consequences if it involves upgrading one or more of the shared primitives.

A container runs a single instance of a component, which may be multi-threaded. Load balancing between the different threads of the component, if any, is the responsibility of the component itself. However, the actual thread pool size is externally configurable—it is not under the control of the component. Thread pool management is also not the component's responsibility. The thread pools are created by the agent and managed by the containers.

As far as the support provided by LCM Services for components, messaging is the only way a component communicates with the rest of the system; a component does not expose any of its interfaces to the system apart from those specified in the container-component contract, which are exposed to the container. Messages for an instance of a component are received by its container in a container-managed queue.

Figure 4:
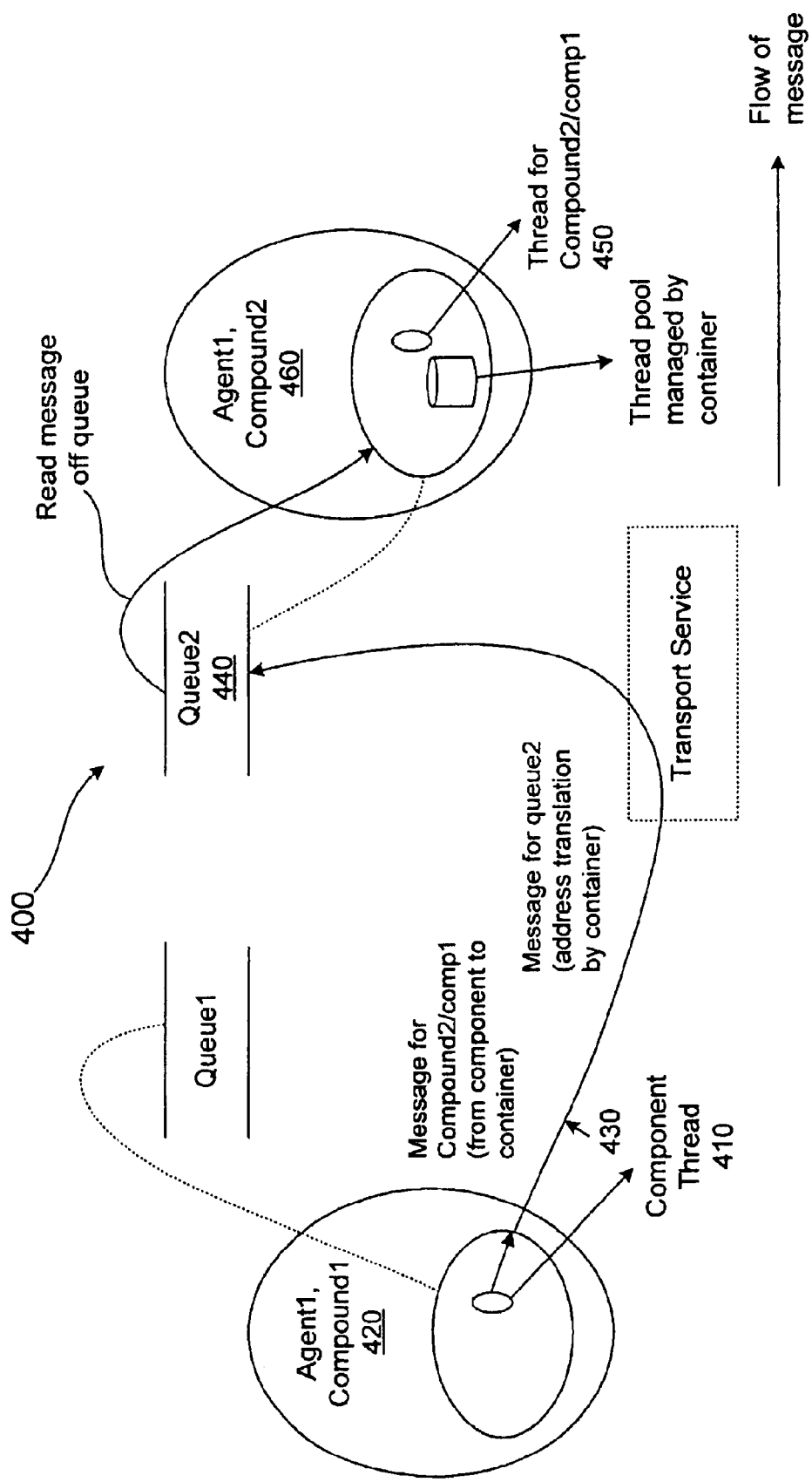
FIG. 4 is a schematic flowchart of the process whereby messages are passed between components.

FIG. 4 shows the process 400 of passing messages between components. Active component thread 410 in Compound1 420 sends message 430 to Queue 440 for the destination component 450 in Compound2 460 (designated Compound2\Comp1).

However, a component may choose to expose any interface and interact that interface with the rest of the system if the component provides support for such mechanism itself. There is nothing in the LCM Services that precludes such behavior in a component.

The responsibility of mapping a component name (within the context of its compound) to a queue is with the container of the caller component. The actual delivery is handled by the transport service.

A component is handed over a thread of execution by the container for processing a message once a message has come into the container-managed queue. The component processes the message and returns the thread to the container. A component can send messages to other components through container provided services. In some embodiments, all messages are eXtensible Markup Language (XML) documents.

A component is handed over an XML document as its configuration information. Platform services (discussed below as part of the Administration Services functionality) provides utilities to the component for parsing the configuration document. The component configuration may be changed at run-time.

An instantiation of a component cannot be part of more than one deployed compound.

The life-cycle of a component instance is managed by its container. The container and its component have a well-understood contract:

A component instance can start itself up. That is, once the component is activated by its container, the component knows how to initialize itself with the configuration information provided at startup. From a container's perspective, starting a component may not necessarily mean giving the component a thread of execution. Starting merely initializes the component, given the configuration information. Configuration information is in the form of an XML document. The interpretation of 'start' invocation is left to the container itself.

A component instance can shut itself down cleanly when instructed by its container. Shutting down involves post thread-deactivation cleanup. In addition, a component can shut itself down if the business application logic so dictates.

A component instance can perform pre- and post-version upgrade services when informed by its container that it is being version upgraded. Such services constitute writing out the component's context, shutting down and starting the new version up in the context provided by LCM Services. Version upgrade for a component is managed by the component's container, in conjunction with CA 210.

A component instance can reconfigure itself when instructed by its container. Configuration information is in the form of an XML document.

Compound

A compound is a logical concept. A compound exists only as a collection of components. Creating a compound is simply a way of letting LCM Services know that a certain set of components have to be treated as a whole with respect to installation, de-installation, etc., and has to be started in a certain sequence and stopped in a certain sequence.

A compound describes the deployment of the entire product. Such description is in the form of XML documents that are understood by LCM Services. The deployment information contains names of constituting components and/or compounds, names of agents for deployment of components, and names of servers for starting up the agents, among other information. For each component within a compound, the deployment information contains, e.g., the library/class file name for the component, initial configuration information, number of instances to be deployed in the agent at startup, etc.

Figure 5:
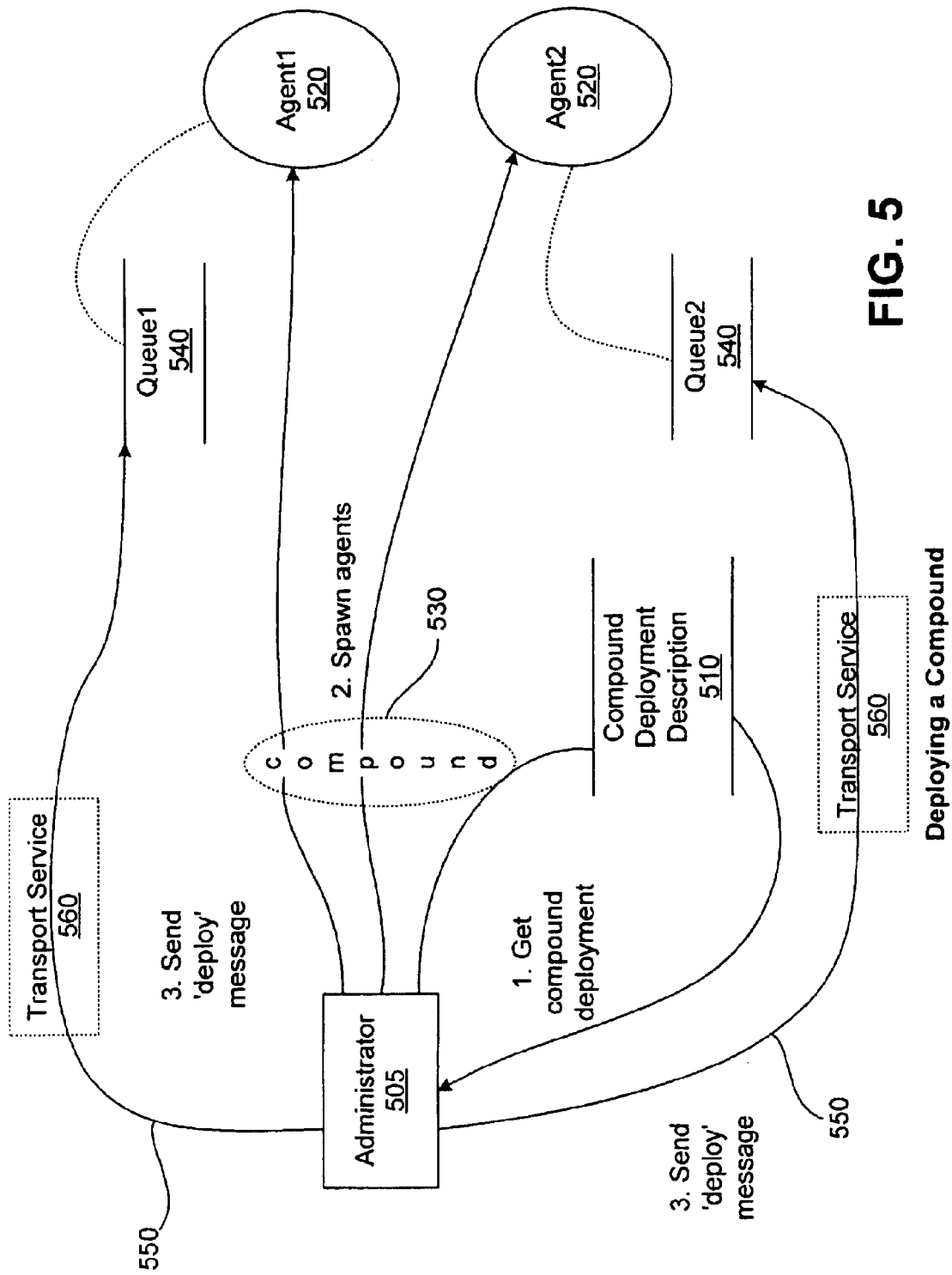
FIG. 5 is a schematic flowchart of the process whereby a compound is deployed.

FIG. 5 illustrates the process of deploying a compound. First, Administrator 505 (here CA 210) retrieves the XML file containing the compound deployment description 510. CA 210 instructs each DA 310 to start up. (Each DA is like a daemon, it is always "alive" and listening). CA 210 gives each DA 310 all the deployment configuration information required to operate. Each DA may hold some information locally to enable restart and resynchronization without CA intervention.

Agents 520 are spawned accordingly, defining the compound 530. Each agent has its own queue 540. Finally, Administrator 505 sends "deploy" messages 550, via transport service 560, to activate ("deploy") each agent 520.

It is the responsibility of LCM Services to start up, stop, version upgrade, and configure the compound, based on the deployment information for that compound. Starting up a compound means starting up its constituent components in an order specified in the deployment information. Stopping a compound means stopping its constituent components in a specified order, based on the deployment information. Version upgrading a compound is meaningful only in terms of version upgrading its constituent components. In one embodiment of the present invention, version upgrades are provided only in terms of individual components. Configuring a compound is meaningful only in configuring some common parameters shared by its constituting components. Health checking a compound is not meaningful. Only its constituent components can be health-checked.

A compound may be deployed on one or more servers, that is, its components can span servers. The same compound may be deployed on multiple servers to provide high availability. A compound is deployed as one or more agents on the same server or across servers, each agent running a subset of the components that form the leaves of the compound tree hierarchy.

LCM Services, in particular CA 210, maintain dependency information about a compound on its components.

The above framework is further explained in FIG. 1. FIG. 1 illustrates a portion of a single runtime deployment view of a business application 100 with fully integrated life cycle management functions, in accordance with one embodiment of the present invention. The deployment view may be looked at as a tree with deployment view 110 at its root and compounds 120 and agent instances 130 as its nodes. Containers 140 form the leaves of the deployment tree. FIG. 1 further illustrates the ability of the present invention to provide life-cycle management services for applications operating on multiple servers 160 with a single deployment.

Here, containers 140 are synonymous with components 150 since each container 140 manages only one type of component 150 and receives and processes life-cycle messages only for that component.

In the case of multiple instances of a single agent 130 (e.g., where agent1 and agent2 are separate instantiations of the same class and methods), each instance forms a distinct node in the deployment tree. Multiple instances of a single agent are used to help balance processor loading.

FIG. 2 shows, in accordance with one embodiment of the present invention, a deployment of a business application on a single server running CA 210. In this case, two deployed views 160 (two instances of the application) are deployed with different instantiations of compounds 120, agents 130, containers 140, and components 150.

Note that there is no limitation on the number of deployment views 160 present in the application as a whole. Multiple instances (deployment views) may be used on one server/host or across multiple hosts as depicted in FIG. 1. In any event, CA 210 provides common administration services and interfaces for all deployed views.

In an embodiment employing a multi-server implementation, DA 310 (FIG. 3) has a more limited view. Each virtual node 160 (i.e., each server-based node) contains a three-tiered process/thread tree with DA 310 at the root, agent instances 130 as intermediate nodes, and containers 140 (also referred to as container threads) as leaves.

Container

A container is the execution bed of a component instance, which isolates the component from platform and transport service complexities (discussed further below). The container receives and processes life-cycle and other administrative messages for the component associated with it. The component may also choose the container to receive its business messages. The container hands over all business messages to the component instance it manages. There is a one-to-one mapping between a container and a component instance.

A container provides a thread of execution to a component within an agent. It insulates the component from all transport and platform details. A container further maintains a thread pool from which it takes threads to give to its component instances for execution (message processing). When a component is done processing, the thread is returned to the thread pool.

A container may start up the component on its own thread of execution (in the case where the container is supposed to run only one instance of the component) or on a different thread, depending on the deployment information for the component.

A container contains only one type of component. The container contains only one instance of its component, and the component itself may be multi-threaded. Load balancing between these threads, if any, is left to the component.

Figure 6:
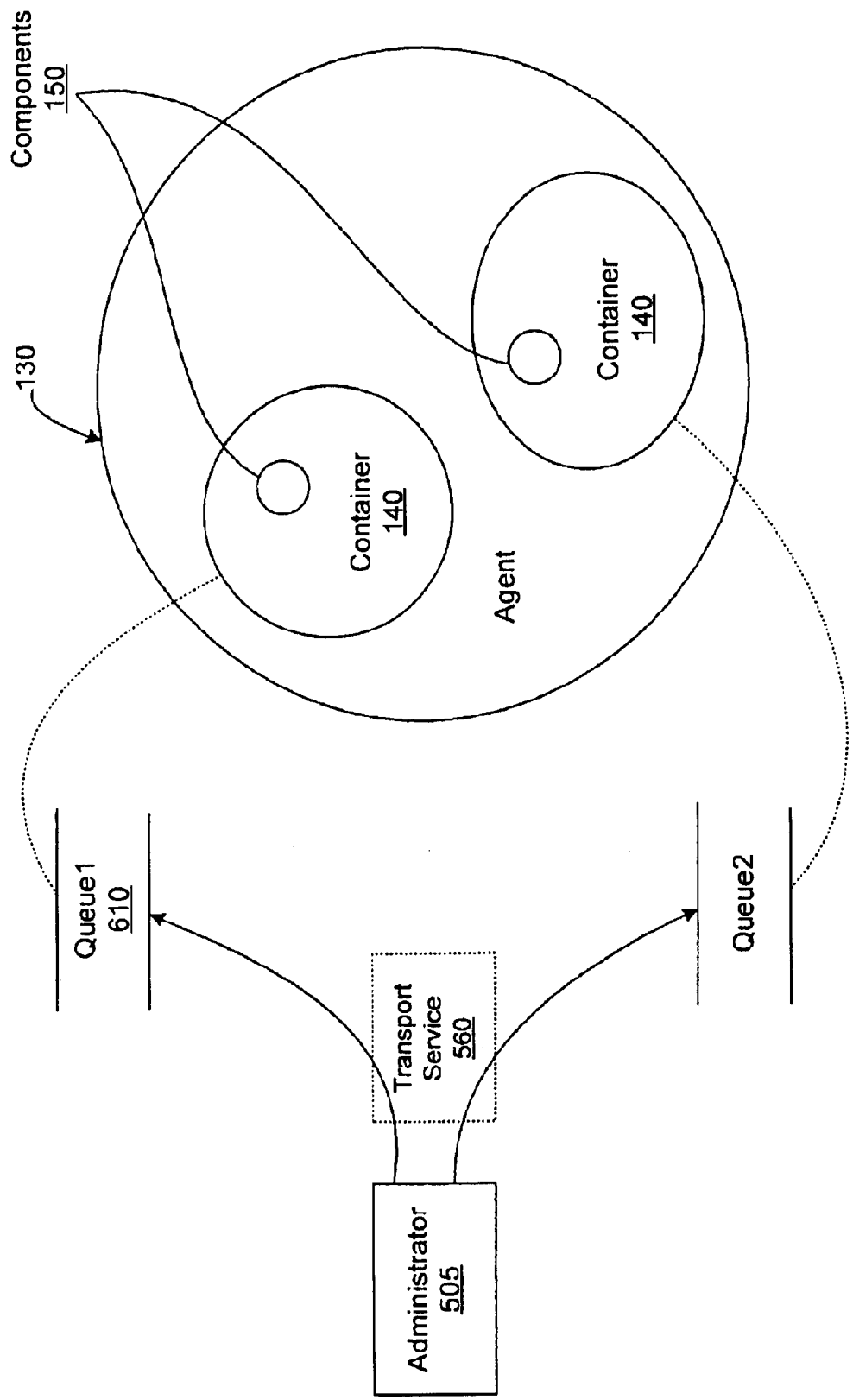
FIG. 6 is a schematic flowchart of the process by which messages are routed to components.

The container is transparent to the rest of the system (i.e., the business application incorporating LCM Services), apart from the agent in whose context it is executing. The system deals only with components. The container manages its component's queue and works together with the transport services to route messages to components. FIG. 6 illustrates the process by which messages are routed.

Administrator 505 (in particular, CA 210) sends administrative messages to each agent queue 540 (FIG. 5) via transport services 560. Such messages include, but are not limited to, start, stop, health-check, and configure messages. When ready to process a message, agent 520 reads the message from queue 540 and responds accordingly.

Administrator 505 also sends messages to container queues 610 for starting, stopping, configuring and health checking the containers.

The container polls its queue for messages. Such messages may be life-cycle messages or business messages for the container's components. The container understands the difference between the two types.

During message send, the container is responsible for translating the compound\component form of address given to it by its component into the published address for the destination queue.

The container is responsible for understanding life-cycle messages to start/stop/configure/version upgrade/health-check instances of the component for which the container is responsible. The container invokes corresponding methods of its component's instances. Signatures of such methods are fixed, based on the container-component contract.

The container delegates all other messages to its constituent component. Methods to be invoked for message processing are also based on the component-container contract.

If there are two instances of a container's agent within the same server or across servers, for high availability reason then containers for each components of the same type in the two agents read off the same queue for load balancing. Each container in this case uses a message selection mechanism to read messages meant for its instance off the queue.

A container is responsible for responding to health-check messages for the component it manages. A component is deemed healthy if it is able to process the next business message.

Agent

An agent is a process within the context of which a container executes. The agent receives and processes messages related to life-cycle management of its containers. An agent has exactly one instance of any container type running in the agent's context. Multiple instances of an agent may run on multiple servers (i.e., nodes, virtual or real). Multiple instances of an agent may share the same queue for efficient resource consumption. Messages are then filtered based on agent process IDs to direct them to the proper agent.

Figure 7:
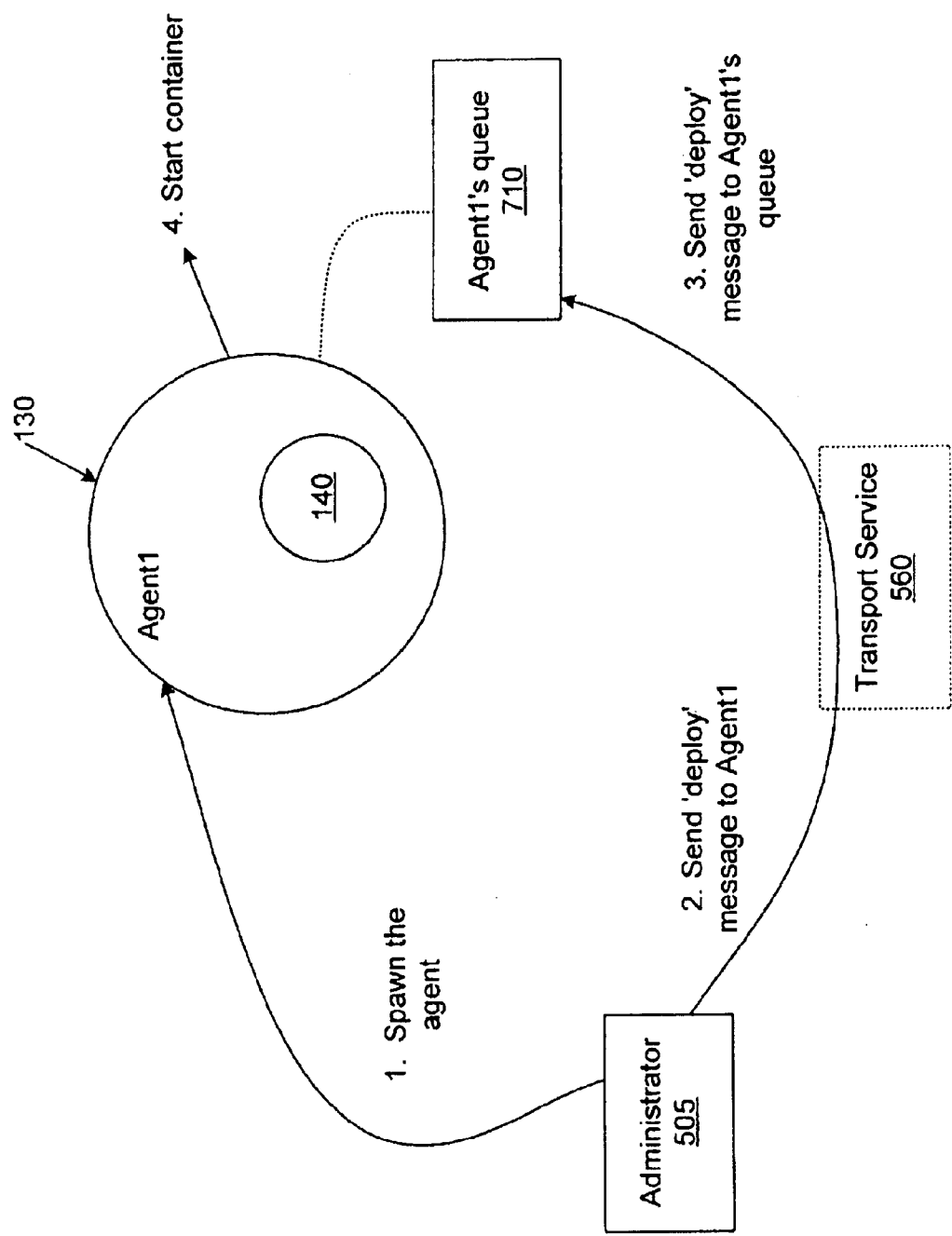
FIG. 7 is a schematic flowchart of the process by which a "deploy" message is processed.

A compound is deployed as a number of agents running instances of the compound's components. An agent maintains its own queue for receiving messages for startup, shutdown, and deployment of the agent. FIG. 7 illustrates the deployment process. Configuration change messages are also processed by the agents.

In FIG. 7, administrator 505 (typically, DA 310) first spawns agent 130. Next, administrator 505 sends a "deploy" message to agent queue 710 via transport services 560. Agent 130 starts up container 140 in response to this message and the container begins executing. Container 140 does not read messages off the agents' queue; container 140 has its own message queue.

An agent is required to send 'heartbeats' to the Administrator at regular intervals, to indicate that it is up. The heartbeat message also contains any delta state changes for the components running in the agent's context.

During system startup, an agent is started up by Administration Services for the server. For deployment of components, an agent is handed deployment information about the components it has to instantiate within its process space. The agent starts up a container thread for each such component type as a part of the deployment Note that containers of the same type within multiple instances of an agent also share queues in order to balance the processing load of business messages, a technique also known as load-balancing. Life cycle messages may then be filtered as in the agent case above, based on the process ID of the containing agent.

Deployment

Figure 8:
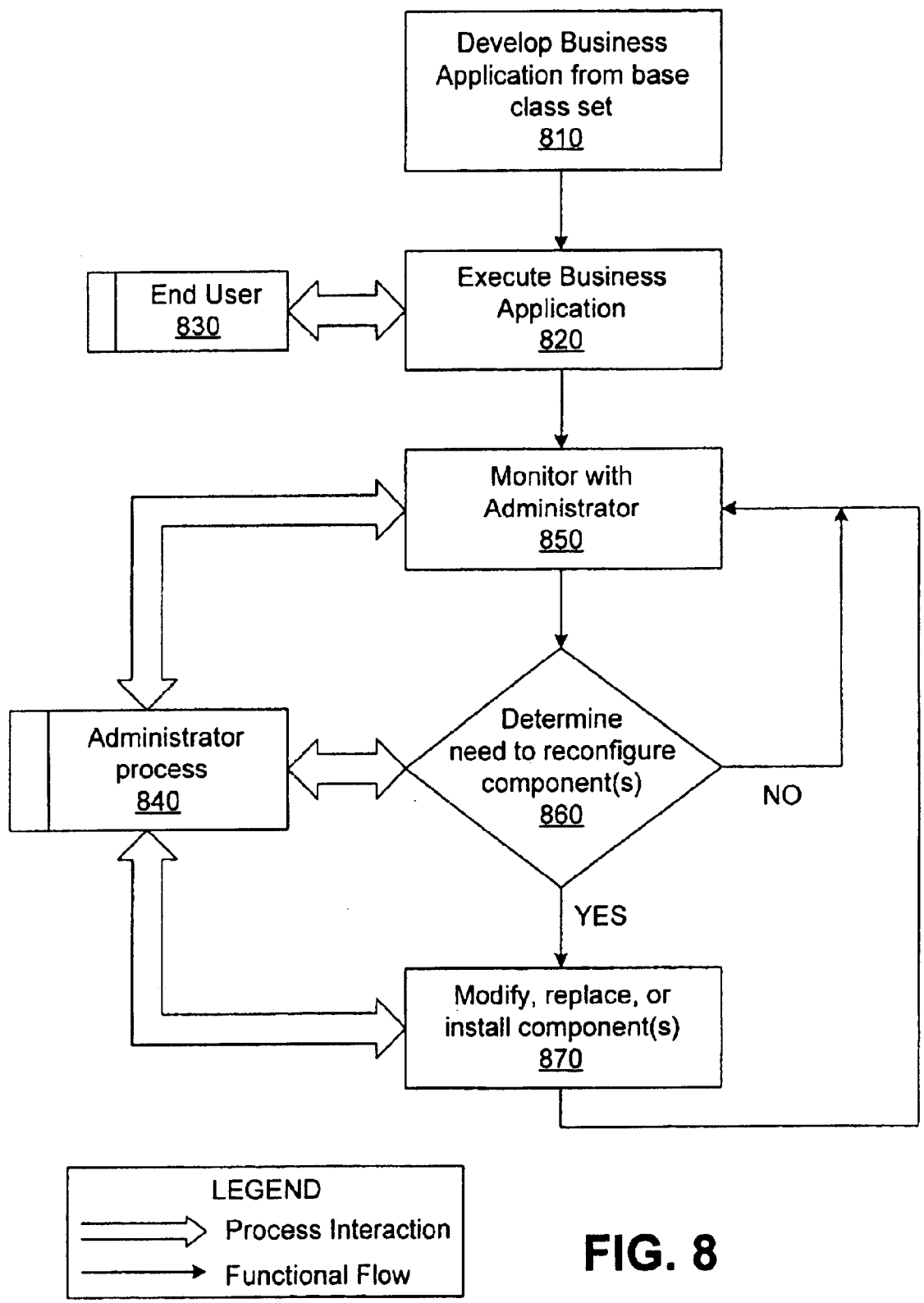
FIG. 8 is a flowchart of the method developing and deploying a business application according to one embodiment of the present invention.

A business application utilizing the LCM Services of the present invention is developed and deployed according to the flowchart of FIG. 8. Development of the application begins at step 810, where the business application software is written (coded) from a pre-determined base class utilizing OOP methods well-known in the art by a developer or team of developers.

The business application may be written in one or more programming languages known in the art, such as C++ or Java. In situations where some components are written in one programming language and others are written in another language, the application is referred to as a multi-platform application. (Software designed and developed to run on more than one kind of computer system, such as UNIX or Windows, is also referred to as multi-platform software. The two terms should not be confused: in the context of this disclosure, the term "multi-platform" refers only to business applications having components or modules written in more than one programming language.)

The present invention operates across both multiple software languages and multiple execution (operating system) environments. For example, multiple OS platform support is an inherent feature of the Java language.

After compiling and linking as required (both actions being well understood in the software arts), the business application is deployed (i.e., installed or loaded onto the appropriate server or host computer designated by the developers or end users) by conventional means. The program is then executed (run) instep 820. Typically, such a business application is deployed on several server/host computers connected together by a network. While executing, the business application interacts with end users in step 830, performing the functions required by the business and the users.

At this point, the DAs on each server/host computer are already running. The DAs behave analogously to a conventional daemon, operating according to pre-defined methods and utilizing locally cached data When the central administrator process 840 (usually referred to as the Administrator) comes up, it begins to monitor the status of each and every component in the application, step 850. In this context, the term "component" includes not only components 150 (FIG. 2), but also containers 140. Administrator process 840 constantly seeks to determine (in step 860) whether any components or compounds require reconfiguration. Reconfiguration includes, but is not limited to, modification, replacement, or installation of new compounds, components, or instances of existing components.

The monitoring of steps 850 and 860 is actually accomplished by a combination of health report messaging from each agent to its DA, process schedule checking by each DA, and health messaging from each DA to the CA.

Each agent is expected to send a health status message for all of its containers and components to its DA. The DA, likewise, expects such messages on a regular basis. The lack of a message is interpreted by the DA as an indication of trouble in the non-responsive agent.

Alternatively, the DA can check the task/process schedule table on the server/host. Since each agent is mapped to a scheduled process, the process schedule table can supply a direct indication of whether the agent (process) is still alive.

The CA cannot monitor DA health by checking a schedule table, because DAs typically execute on a different host computer. Accordingly, the CA does not have access to DA process status. Thus the CA must monitor DA status by means of health messages from each DA.

As with agent, container, and component health messages to the DA, the content of the DA health message to the CA must be determined by the parameter or parameters critical to the business application. For example, if state synchronization is critical to the business application, then a necessary health indicator could be the actual state of key parameters in each agent.

In some embodiments of the present invention, only changes in DA health are sent to the CA in periodic health status messages. Such "health-delta" messages reduce message traffic between the CA and DA, thus economizing inter-process communications.

The CA also monitors (step 860) by determining when a component needs to be updated or replaced. Numerous conventional messaging methods can be employed to enqueue a directive to the CA to modify one or more components, containers, or agents. Such changes may be initiated by a human administrator of the lifecycle of the business application, a business application user, or by fault detection within the application itself. For example, if the health monitoring process described above indicates that a particular agent has died, the monitoring process (steps 850, 860, and 870) may respond by re-instantiating that agent, synchronizing it, and restarting it, in effect deploying a new agent to replace the broken one.

If step 860 determines, for any of the above reasons, that a need for component reconfiguration has arisen, the administrator acts accordingly in step 870.

This reconfiguration does not terminate or otherwise permanently stop the execution of the business application, although (for data preservation, synchronization, and message stream integrity reasons well-understood in the art), processing may need to suspend temporarily in order to synchronize the new component with the current application state.

After reconfiguration, if any, the process of FIG. 8 loops to monitoring step 850 until business application execution 820 is terminated, as by a command from end user 830.

Although the administrator process 840 and functions (step 850 through 870) are described, one of ordinary skill in the art can appreciate that various aspects can be carried out by either a Central Administrator or one or more Distributed Administrators. While, in some embodiments, the Central Administrator is the only administrative entity possessing a state and configuration database, it is apparent that the state cache information in each DA (used for re-synchronization) is readily expandable. Accordingly, the invention is not limited to a particular administration architecture; both architectures having a single CA plus multiple DAs and architectures having only multiple DAs are within the scope of the present invention.

Administration Services

The Administration Services module (or functionality) of LCM Services is responsible for startup and shutdown of components, coordinating version upgrades, dynamic configuration of components, health checking of components, and load balancing and failure recovery in conjunction with other standard, well-known platform monitoring services. Functionally, it may be divided into a number of more specific services, but some functions in themselves are not complex enough to warrant a service for their own. For ease of reference, this host of services has been grouped together under the label "Administration Services."

Because a product may be distributed across multiple servers, a Central Administrator (e.g., CA 210) function is necessary. The user thus only needs to communicate with the Central Administrator using the Graphical User Interface (GUI), discussed under "External Interfaces" below. The Central Administrator then communicates with one or more Distributed Administrators (e.g., DA 310), one for every server.

As noted above, a Distributed Administrator is a process manager for the agent processes. The Distributed Administrator is unaware of the deployment hierarchy. Distributed Administrators (DAs) spawn agents when instructed to by the Central Administrator (CA), passing each agent instance a configuration file that contains the configuration information for the agent, including a containment hierarchy. DAs also shut down the agents when so instructed by the CA.

Complexity in the CA is reduced by the presence of DAs because the need for (remote) spawning, management, and removal by the CA is eliminated. DAs add a second level of control, managing the agent processes on a node and thereby reducing cross-server message traffic. The DAs create all transport queues and remove all transport queues on their virtual nodes, except their own. The CA destroys the queue of the DAs when necessary.

Each DA periodically sends a heartbeat message to the CA. Piggybacked on the heartbeat message, the DA sends only the changes to component state (i.e., "delta changes") in its virtual node to the CA. Whenever any agent fails to send a heartbeat message to the DA, its state is marked down. A component state change is reported to the DA by the corresponding agent.

DAs also perform failure recovery of components and agents running on each virtual node. Components are started up as threads in the agent process space, so component failures typically result in, or result from, agent failures.

In case of failure of a component, the DA restarts the component based on the agent's configuration information. If a component has persistent queues, these queues are maintained even if the component is shutdown and restarted. Such queues live through system crashes as well and only go down when the transport services go down.

The CA is responsible for administering the components that constitute a deployment view. The CA has deployment information about all compounds and components. The CA maintains a repository of information containing the deployment hierarchy and the configuration and state information for all agents and components.

When a compound (or component) needs to be deployed or shut down, the CA identifies the server(s) on which the compound\component should be deployed and informs the DA for that server to start up/shut down the corresponding agents as appropriate. Each agent is handed configuration information by the CA. The configuration information is merely data describing which containers or components to start up. An agent, as a part of its deployment process, starts up all the containers. Component startup is initiated by the CA.

When a component needs to be started, stopped, configured, or health-checked, the CA identifies the container queue for the component instance and sends an appropriate message to the queue. The container invokes the corresponding methods for the component. In this context it should be understood that for a component to start, the Administrator (CA or DA) must know to which compound the component belongs. Since the same component can be a sub-component of a number of compounds, starting, stopping, or configuring a component is always done in the context of a particular compound.

During shutdown of the entire product, the CA informs the DAs on each server. The DAs, in turn, shutdown all agents, remove all queues, and inform the CA before shutting themselves down. Each agent, as a part of its shutdown process, stops all its running components and then exits. Finally, the CA shuts down.

The deployment information for each compound specifies its constituent components and/or compounds and how the components/compounds are to be deployed.

The deployment information for each component specifies the implementation specifics of the component and pointers to the configuration information for each component.

The deployment and configuration information are stored in structured XML documents.

The CA depends on a scheduling services or on an external user, for example a system administrator, for load balancing. The scheduling service (or the system administrator) initiates the starting or stopping of agents based on system load. The CA ensures that the agents' start/stop is executed.

The CA is also responsible for creating and updating the management information base (MIB) tree, which reflects the deployment view tree.

The CA, in conjunction with the DA, is responsible for crash recovery of both the CA and the DAs. Crash recovery is accomplished by re-synchronization of the CA's deployment view and the agent/component view of each DA. During crash recovery, the CA is the master and overrides all DAs. This may mean that additional agents have to be started at a node or existing agents brought down, to conform to the CA's view.

The CA performs the following functions:

Deploy Compound

The CA identifies the server(s) where the compound is to be deployed, and informs the DAs (in the identified servers), to start up the agent processes. Each DA is handed a list of agents to spawn and a configuration file describing its containment hierarchy and other configuration information.

The DAs, in turn, spawn the agents. Each agent creates agent and container queues and starts up container threads. Each agent then informs the CA, which sends a 'startup component' message to the container queue. The startup message is read off the queue by the container. The configuration information for the component is packed in an XML document as a part of the message.

The container invokes the startup method for the component. The component reads the configuration information and initializes itself. Once the component comes up, the container informs the CA. The CA also marks the component 'active' in its database.

Start Component

A component is started up only in the context of a compound. If there are several instances of the component running in the context of different agents within a compound, a startup message will startup all the component instances. If a specific instance of the component has to be started, then the startup message is for the Compound\Specific Agent Instance\Component only. While starting up a component, the CA assumes that the agent process for the component is running and the container queue has been created.

The CA then identifies all the agents within the compound that run the component in their context. For each agent, the CA sends a 'startup component' message to the container queue. The startup message is read off the queue by the container. The configuration information for the component is packed in an XML document as a part of the message. The message is filtered based on agent process ID.

The container next invokes the startup method for the component. The component reads the configuration information and initializes itself.

Once the component comes up, the container informs the CA. The CA also marks the component 'active' in its database.

Removing A Compound

The CA identifies the server(s) where the compound is deployed. The CA identifies the agents in terms of which the compound has been deployed and informs the DA on the applicable server(s) to shutdown the appropriate agents. The DA sends a shutdown message to each identified agent process.

The agent, as a part of its shutdown sequence, sends a shutdown message to each of the components running in the agent's context. This message is interpreted by each component's container, which then invokes the shutdown method for each component instance. If the instance is executing on threads, the container has the choice of either waiting until the threads run to completion or interrupting the threads.

The agent monitors the health of each component until each component state shows 'DOWN'. The agent then informs the CA and shuts itself down.

The CA updates its database as and when an agent removes itself and finally removes the compound from its database.

Stopping A Component

A component is stopped only in the context of a compound. If there are several instances of the component running in the context of different agents within a compound, a stop message will stop all the component instances. If a specific instance of the component has to be stopped, then the stop message should be for the compound specific agent instance\component only.

The CA identifies all the agents within the compound that run the component in their context. For each agent, the CA sends a 'stop component' message on the container queue. The stop message is read off the queue and understood by the container, that invokes the shutdown method for the component. Once the component shuts down, the container informs the CA, which then updates the component state it is database.

Configuring A Compound Or Component

Configuring applies to both a compound and a component. If a compound is being configured, then the same configuration information will be passed to all its components, because there usually is some common configuration information that applies to each component. Components can also be configured individually.

If a compound is to be configured, the CA traverses the compound's constituent hierarchy until it identifies all the components to be configured. In such a case, each component is passed the same configuration information. For each component, the following sequence of actions takes place:

The CA sends a 'Configure component' message to the queue of the component, together with the configuration information.

The container reads the message off the queue and invokes the configuration method for the component, passing the configuration information.

The component configures itself and the container informs the agent.

Health-Checking A Component

The CA may also send a 'health-check component' message to the queue corresponding to the component. This message is read off the queue and interpreted by the container. The container checks the health of the component and informs the CA. The CA updates its database accordingly. The health of a component is the state of the component and is determined by the component's ability to process the next business message.

Although a particular set of generalized Administration Services are described, those skilled in the art will realize that various well-known forms of administrative and platform services other than the above can be used. Accordingly, the invention is not limited to any particular type of Administration Services model or implementation.

External Interfaces

The Life-Cycle Management Service functionality of the present invention also provides a Graphical User Interface (GUI) to enable the user to traverse the deployment tree in terms of compounds, agents and components. The user can modify the deployment view via modifications to the tree, (e.g., compounds or agents may be added or removed). Components are intrinsically associated with agents and modifying an agent's structure by removing one or more of its components, or by adding new components, is not allowed. Configuration information for compounds/agents/components may also be modified through the deployment tree.

In addition, the CA also provides a messaging interface for receiving messages related to:

Starting/stopping components

Removing/adding compounds

Re-synchronization with a DA

Version upgrade-related messages

Configuration management of compounds/components

Miscellaneous functions (e.g., identifying all instances of the same component type)

Life-Cycle Management Services interacts with the business application components through a well-defined set of interfaces in terms of methods with well-defined signatures. All components must support these methods in order to interact with Life-Cycle Management Services.

The user of the system interacts with the system through the CA, either through the GUI or through a messaging interface.

The GUI lets the user traverse through the deployment tree. The GUI interprets the deployment hierarchy and depicts it in the form of a tree with links from each node to all of its children.

The CA sits at the root of the tree and it manages all components in the system. The user can traverse the entire tree, through the compounds, agents, and down to the containers/components by simple mouse clicks. At each level, configuration information is provided about the node in the tree, as well pointers to its immediate children.

Modifications are allowed at any level of the tree, but depending on the entity on which the user is operating, such modifications may be restricted. Compounds may be added to or removed from a deployment view. Agent instances may be removed from or added to a compound. However, an agent may only contain containers or components and the structure of the agent is fixed. Attribute value changes are allowed at any level and such changes are often communicated to all the children of the node where the value has changed. This simplifies changing the configuration at any level.

The CA further provides a messaging interface for the user to interact with the system. The messaging interface provides a means to startup or shutdown components and also for version upgrade of components.

Startup or shutdown of components may be performed on all instances of the component within a compound or may be for a specific instance of the component. If the message is for all component instances, the full deployment name of the component, in the form compound\component is to be provided in the message. For a specific component instance, the agent name must also be provided. The deployment name for the component would then be of the form Compound\Agent\Component.

Version upgrade of a component requires that the user provide the component type, the names of the old class files/shared libraries, and the new class files/shared libraries replacing them.

Transport and messaging services are provided by standard messaging methods well known in the object oriented programming art and not further discussed herein.

Alternate Embodiments

The order in which the steps of the present invention are performed is purely illustrative in nature. In fact, the steps can be performed in any order or in parallel, unless otherwise indicated by the present disclosure.

The method of the present invention may be performed in either hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

We claim:

1. A method of managing software components, said method comprising:

deploying one or more software components on a plurality of computer platforms wherein said components interoperate with each other to execute a business application;

monitoring said components with an Administrator, said Administrator functioning independently of said components, said Administrator comprising a Central Administrator and a plurality of Distributed Administrators where each computer platform has one of the Distributed Administrators;

determining a need to reconfigure one or more said components based upon a health status message from an agent in a computer platform to a Distributed Administrator in the computer platform, based upon a process schedule check of the computer platform by the Distributed Administrator, or based upon a health status message from each Distributed Administrator to the Central Administrator;

wherein the Distributed Administrator is a process manager for a process of the agent;

wherein each of the components is managed by an associated container and runs in the context of the agent; wherein the container receives and processes life-cycle messages and other administrative messages from the Central Administrator to one of the components and provides a thread of execution to one of the components; and wherein the agent can read and respond to the messages; and modifying or replacing one or more said components using said Administrator in response to said determining; wherein said monitoring, said determining, and said modifying are performed without reference to said computer platforms and wherein said modifying or replacing reconfigures said business application without terminating said business application;

wherein said modifying or replacing one or more said components comprises:

sending, by the Central Administrator, configuration information and a message indicating that a component is to be modified or replaced, where the message is sent to a queue of the component;

reading, by a container, the message from the queue, and passing, by the container, the configuration information to the component; and controlling, by the Central Administrator, the modifying or replacing of the component.

2. The method of claim 1, wherein two or more of said plurality of computer platforms are geographically separated from each other.

3. The method of claim 1, wherein said monitoring comprises receiving health status messages each containing only changes in health status since receipt of a last health status message.

4. A computer system for managing software components, comprising computer instructions for:

deploying one or more software components on a plurality of computer platforms wherein said components interoperate with each other to execute a business application;

monitoring said components with an Administrator, said
Administrator functioning independently of said
components, said Administrator comprising a Central
Administrator and a plurality of Distributed Administrators where each computer platform has one of the
Distributed Administrators;

determining a need to reconfigure one or more said
components based upon a health status message from
an agent in a computer platform to a Distributed
Administrator in the computer platform, based upon a
process schedule check of the computer platform by the
Distributed Administrator, or based upon a health status
message from each Distributed Administrator to the
Central Administrator;

wherein the Distributed Administrator is a process manager for a process of the agent;

wherein each of the components is managed by an associated container and runs in the context of the agent;
wherein the container receives and processes life-cycle
messages and other administrative messages from the
Central Administrator to one of the component and
provides a thread of execution to one of the component;
and wherein the agent can read and respond to the
messages; and modifying or replacing one or more said components
using said Administrator in response to said determining; wherein said monitoring, said determining, and
said modifying are performed without reference to said
computer platforms and wherein said modifying or
replacing reconfigures said business application without terminating said business application;

wherein said modifying or replacing one or more said
components comprises:

sending, by the Central Administrator, configuration
information and a message indicating that a component
is to be modified or replaced, where the message is sent
to a queue of the component;

reading, by a container, the message from the queue, and
passing, by the container, the configuration information
to the component; and controlling, by the Central Administrator, the modifying
or replacing of the component.

5. The method of claim 4, wherein two or more of said
plurality of computer platforms are geographically separated
from each other.

6. The method of claim 4, wherein said monitoring
comprises receiving health status messages each containing
only changes in said health status since receipt of a last
health status message.

7. A computer readable storage medium, comprising
computer instructions for:

deploying one or more software components on a plurality of computer platforms wherein said components
interoperate with each other to execute a business
application;

monitoring said components with an Administrator, said
Administrator functioning independently of said
components, said Administrator comprising a Central
Administrator and a plurality of Distributed Administrators where each computer platform has one of the
Distributed Administrators;

determining a need to reconfigure one or more said
components based upon a health status message from
an agent in a computer platform to a Distributed
Administrator in the computer platform, based upon a
process schedule check of the computer platform by the
Distributed Administrator, or based upon a health status
message from each Distributed Administrator to the
Central Administrator;

wherein the Distributed Administrator is a process manager for a process of the agent;

wherein each of the components is managed by a container and runs in the context of the agent; wherein the
container receives and processes life-cycle messages
and other administrative messages from the Central
Administrator to one of the components and provides a
thread of execution to one of the components; and
wherein the agent can read and respond to the messages; and modifying or replacing one or more said components
using said Administrator in response to said determining; wherein said monitoring, said determining, and
said modifying are performed without reference to said
computer platforms and wherein said modifying or
replacing reconfigures said business application without terminating said business application;

wherein said modifying or replacing one or more said
components comprises:

sending, by the Central Administrator, configuration
information and a message indicating that a component
is to be modified or replaced, where the message is sent
to a queue of the component;

reading, by a container, the message from the queue, and
passing, by the container, the configuration information
to the component; and controlling, by the Central Administrator, the modifying
or replacing of the component.

8. The method of claim 7, wherein two or more of said
plurality of computer platforms are geographically separated
from each other.

9. The method of claim 7, wherein said monitoring
comprises receiving health status messages each containing
only changes in said health status since receipt of a last
health status message.

10. A computer data signal embodied in a carrier wave,
comprising computer instructions for:

deploying one or more software components on a plurality of computer platforms wherein said components
interoperate with each other to execute a business
application;

monitoring said with components with an Administrator,
said Administrator functioning independently of said
components, said Administrator comprising a Central
Administrator and a plurality of Distributed Administrators where each computer platform has one of the
Distributed Administrators;

determining a need to reconfigure one or more said
components based upon a health status message from
an agent in a computer platform to a Distributed
Administrator in the computer platform, based upon a
process schedule check of the computer platform by the
Distributed Administrator, or based upon a health status
message from each Distributed Administrator to the
Central Administrator;

wherein the Distributed Administrator is a process manager for a process of the agent;

wherein each of the components is managed by a container and runs in the context of the agent; wherein the
container receives and processes life-cycle messages
and other administrative messages from the Central Administrator to one of the components and provides a thread of execution to one of the components; and wherein the agent can read and respond to the messages; and modifying or replacing one or more said components using said Administrator in response to said determining; wherein said monitoring, said determining, and said modifying are performed without reference to said computer platforms and wherein said modifying or replacing reconfigures said business application without terminating said business application;

wherein said modifying or replacing one or more said components comprises:

sending, by the Central Administrator, configuration information and a message indicating that a component is to be modified or replaced, where the message is sent to a queue of the component;

reading, by a container, the message from the queue, and passing, by the container, the configuration information to the component; and controlling, by the Central Administrator, the modifying or replacing of the component.

11. The method of claim 10, wherein two or more of said plurality of computer platforms are geographically separated from each other.

12. The method of claim 10, wherein said monitoring comprises receiving health status messages each containing only changes in said health status since receipt of a last health status message.

13. The method of claim 1, wherein the software components belong to the business application, and wherein a health status message includes content that is determined by at least one parameter that is critical to the business application.

14. The method of claim 1, wherein the software components are developed from a set of base classes that utilize object oriented programming (OOP) methods, in order to deploy a common set of OOP methods across all software components.

15. The method of claim 1, wherein an instance of a software component is configured to run as a single thread or as multiple threads within an agent.

16. The method of claim 1, wherein a Distributed Administrator is configured to spawn an agent, in response to an instruction from the Central Administrator.

17. The method of claim 16, wherein the Distributed Administrator passes a configuration file to the agent, where the configuration file includes configuration information for the agent.

18. The method of claim 1, wherein the Central Administrator and Distributed Administrators perform crash recovery for a computer platform.

19. The method of claim 1, wherein a software component is a simplest addressable logical element within the business application.

20. A method of managing software components, said method comprising:

deploying one or more software components on a plurality of computer platforms wherein said components interoperate with each other to execute a business application;

monitoring said components with an Administrator, said Administrator functioning independently of said components, said Administrator comprising a Central Administrator and a plurality of Distributed Administrators where each computer platform has one of the Distributed Administrators;

wherein the Distributed Administrator is a process manager for a process of the agent;

wherein each of the components is managed by a container and runs in the context of the agent; wherein the container receives and processes life-cycle messages and other administrative messages from the Central Administrator to one of the components and provides a thread of execution to one of the components; and wherein the agent can read and respond to the messages; and determining a need to reconfigure one or more said components based upon a health status message from an agent in a computer platform to a Distributed Administrator in the computer platform, based upon a process schedule check of the computer platform by the Distributed Administrator, or based upon a health status message from each Distributed Administrator to the Central Administrator; and modifying or replacing one or more said components using said Administrator in response to said determining;

wherein said modifying or replacing one or more said components comprises:

sending, by the Central Administrator, configuration information and a message indicating that a component is to be modified or replaced, where the message is sent to a queue of the component;

reading, by a container, the message from the queue, and passing, by the container, the configuration information to the component; and controlling, by the Central Administrator, the modifying or replacing of the component.

21. The method of claim 20, wherein two or more of said plurality of computer platforms are geographically separated from each other.

22. The method of claim 20 wherein said monitoring comprises receiving health status messages each containing only changes in said health status since receipt of a last health status message.

23. The method of claim 20, wherein a health status message includes content that is determined by at least one parameter that is critical to the business application.

24. The method of claim 20, wherein the software components are developed from a set of base classes that utilize object oriented programming (OOP) methods, in order to deploy a common set of OOP methods across all software components.

25. The method of claim 20, wherein an instance of a software component is configured to run as a single thread or as multiple threads within an agent.

26. The method of claim 20, wherein a Distributed Administrator is a process manager for a process of an agent.

27. The method of claim 20, wherein a Distributed Administrator is configured to spawn an agent, in response to an instruction from the Central Administrator.

28. The method of claim 27, wherein the Distributed Administrator passes a configuration file to the agent, where the configuration file includes configuration information for the agent.

29. The method of claim 20, wherein the Central Administrator and Distributed Administrators perform crash recovery for a computer platform.

30. The method of claim 20, wherein a software component is a simplest addressable logical element within the business application.

31. The method of claim 1, wherein the agent sends heartbeat signals to the Central Administrator to indicate that the agent is available and sends health status messages to the Distributed Administrators, wherein the health status messages are associated with the containers and components of the agent.

32. The method of claim 4, wherein the agent sends heartbeat signals to the Central Administrator to indicate that the agent is available and sends health status messages to the Distributed Administrators, wherein the health status messages are associated with the containers and components associated with the agent.

33. The method of claim 1, wherein the agent sends the health status message to the Distributed Administrator at a regular interval.

34. The method of claim 1, wherein the process schedule check is performed by checking, by the Distributed Administrator, a process schedule table that indicates a status of the agent.

* * * * *

UNITED STATES PATENT AND TRADEMARK OFFICE
CERTIFICATE OF CORRECTION

PATENT NO. : 6,904,593 B1
APPLICATION NO. : 09/534703
DATED : June 7, 2005
INVENTOR(S) : Kester Lijen Fong et al.

Page 1 of 1

It is certified that error appears in the above-identified patent and that said Letters Patent is hereby corrected as shown below:

In column 4, line 27, after "view" delete "10" and insert -- 110 --, therefor.

In column 8, line 51, delete "reason" and insert -- reasons, --, therefor.

In column 13, lines 61-62, delete "compound specific" and insert -- compound\specific --, therefor.

Signed and Sealed this

First Day of September, 2009

David J. Kappos
*Director of the United States Patent and Trademark Office*